US012436271B2

(12) United States Patent
Kabakian et al.

(10) Patent No.: US 12,436,271 B2
(45) Date of Patent: Oct. 7, 2025

(54) PHASE HISTORY EXTRACTION FOR MOVING TARGET

(71) Applicant: The Boeing Company, Arlington, VA (US)

(72) Inventors: Adour Vahe Kabakian, Monterey Park, CA (US); David Wayne Payton, Calabasas, CA (US); Kangyu Ni, Calabasas, CA (US); Yuri Owechko, Newbury Park, CA (US)

(73) Assignee: The Boeing Company, Arlington, VA (US)

( * ) Notice: Subject to any disclaimer, the term of this patent is extended or adjusted under 35 U.S.C. 154(b) by 213 days.

(21) Appl. No.: 18/295,109

(22) Filed: Apr. 3, 2023

(65) Prior Publication Data

US 2024/0329235 A1 Oct. 3, 2024

(51) Int. Cl.
*G01S 13/90* (2006.01)

(52) U.S. Cl.
CPC ....... *G01S 13/9027* (2019.05); *G01S 13/9054* (2019.05)

(58) Field of Classification Search
CPC .................... G01S 13/9027; G01S 13/9054
See application file for complete search history.

(56) References Cited

U.S. PATENT DOCUMENTS

| 10,317,520 | B2* | 6/2019 | Capraro | G01S 13/90 |
| 2013/0009807 | A1* | 1/2013 | Lamb | G01S 13/904 |
| | | | | 342/25 B |
| 2019/0167500 | A1* | 6/2019 | Baker | G01S 7/03 |
| 2022/0221578 | A1 | 7/2022 | Kabakian et al. | |

OTHER PUBLICATIONS

Du, L. et al., "Radar Automatic Target Recognition Based on Complex High-Resolution Range Profiles," Proceedings of the 2006 CIE International Conference on Radar, Oct. 16, 2006, Shanghai, China, 5 pages.
Jiang, Y. et al., "Robust Automatic Target Recognition via HRRP Sequence Based on Scatterer Matching," Sensors, vol. 18, No. 2, Feb. 14, 2018, 19 pages.

* cited by examiner

*Primary Examiner* — Vladimir Magloire
*Assistant Examiner* — Bongani Jabulani Mashele
(74) *Attorney, Agent, or Firm* — Alleman Hall & Tuttle LLP

(57) ABSTRACT

A method for synthetic aperture radar (SAR) phase history extraction includes receiving, at a SAR system, a set of SAR phase history data derived from a plurality of return signals, the plurality of return signals produced by the SAR system illuminating a scene with a plurality of radar pulses. A region of interest (ROI) is obtained, the ROI corresponding to a moving target within the scene. A doppler shift frequency range for the moving target is determined based at least in part on an azimuth angle spread corresponding to the ROI and a known approximate trajectory of the moving target. The SAR phase history data is filtered to give extracted phase history corresponding to the moving target based at least in part on the doppler shift frequency range.

20 Claims, 12 Drawing Sheets

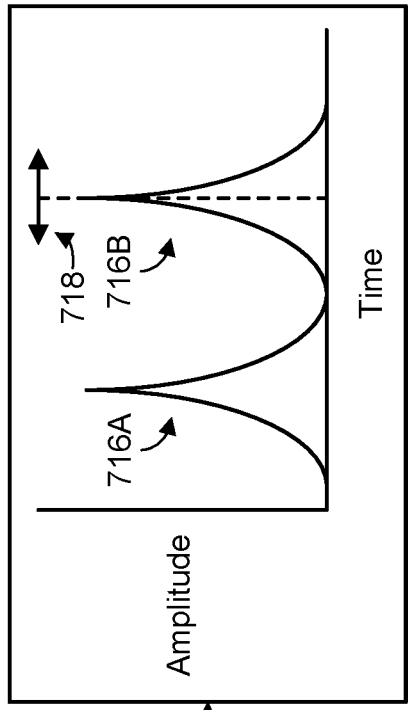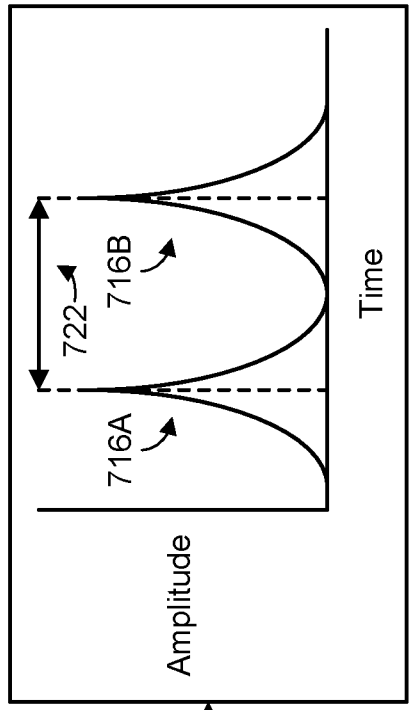
FIG. 7C
FIG. 7D

PHASE HISTORY EXTRACTION FOR MOVING TARGET

FIELD

The subject disclosure is related to Synthetic Aperture Radar (SAR) systems, and more particularly, to systems and techniques for extracting phase history from SAR data.

BACKGROUND

Synthetic-aperture radar (SAR) systems are a form of radar used for remote sensing. SAR systems are generally utilized to create two-dimensional images or three-dimensional reconstructions of objects, such as landscapes or objects within a scene. SAR systems utilize the motion of the radar antenna over a target region (i.e., a SAR scene) to provide finer spatial resolution than conventional beam-scanning radars.

Typically, specific Regions of Interest (ROIs) within the SAR scene, such as targets, are detected and located via image processing algorithms that are applied on an entire SAR image that is produced by the SAR system. Specifically, traditional SAR systems apply techniques developed in image processing for matching and registration of processed SAR images of the SAR scene to expected ground landmarks or objects within the SAR scene. However, image-based SAR systems require conversion of SAR phase history data into image data, which is computationally expensive.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the subject disclosure, a method for synthetic aperture radar (SAR) phase history extraction includes receiving, at a SAR system, a set of SAR phase history data derived from a plurality of return signals, the plurality of return signals produced by the SAR system illuminating a scene with a plurality of radar pulses. A region of interest (ROI) is obtained, the ROI corresponding to a moving target within the scene. A doppler shift frequency range for the moving target is determined based at least in part on an azimuth angle spread corresponding to the ROI and a known approximate trajectory of the moving target. The SAR phase history data is filtered to give extracted phase history corresponding to the moving target based at least in part on the doppler shift frequency range.

The features, functions, and advantages that have been discussed can be achieved independently in various embodiments or can be combined in yet other embodiments, further details of which can be seen with reference to the following description and drawings.

BRIEF DESCRIPTION OF THE DRAWINGS

FIGS. 7A-E schematically illustrate examples of motion correction of extracted phase history to give corrected phase history for a moving target.

DETAILED DESCRIPTION

Typically, upon receiving synthetic aperture radar (SAR) phase history data for a particular scene, the data is used to reconstruct a SAR image for further processing. For instance, the image may be cropped to a specific region of interest (ROI) corresponding to a particular object, and the ROI may be passed to an automatic target recognition (ATR) system trained to perform target recognition based on input image data. However, converting phase history data into a SAR image, and then performing feature recognition on the image to identify specific ROIs, can be an expensive process, both in terms of time and computational power. Furthermore, when the object of interest is moving (e.g., a ground-based vehicle), motion-induced distortions in the phase history can compromise the quality of the resulting image.

Accordingly, the present disclosure describes techniques for extracting the phase history for a moving target from a set of SAR phase history data collected for a particular scene. As compared to image-based approaches, the phase history for a particular target within the scene is intermingled with the phase history for other objects within the same scene—e.g., landscape features, and other stationary or moving targets. As such, according to the techniques described herein, the phase history for a particular moving target of interest is extracted from the composite phase history corresponding to the entire scene based at least in part on the location of an ROI that includes the moving target. After extraction, the phase history data for the moving target is in some examples motion corrected to account for the motion of the target relative to the SAR platform. The extracted phase history data can in some examples be provided to an ATR system trained to perform target recognition on the basis of input phase history data, rather than input image data. Additionally, or alternatively, the extracted phase history data can be used to reconstruct a SAR image representation of the moving target that is beneficially less subject to motion-induced distortions of the phase history data.

Figure 1A:
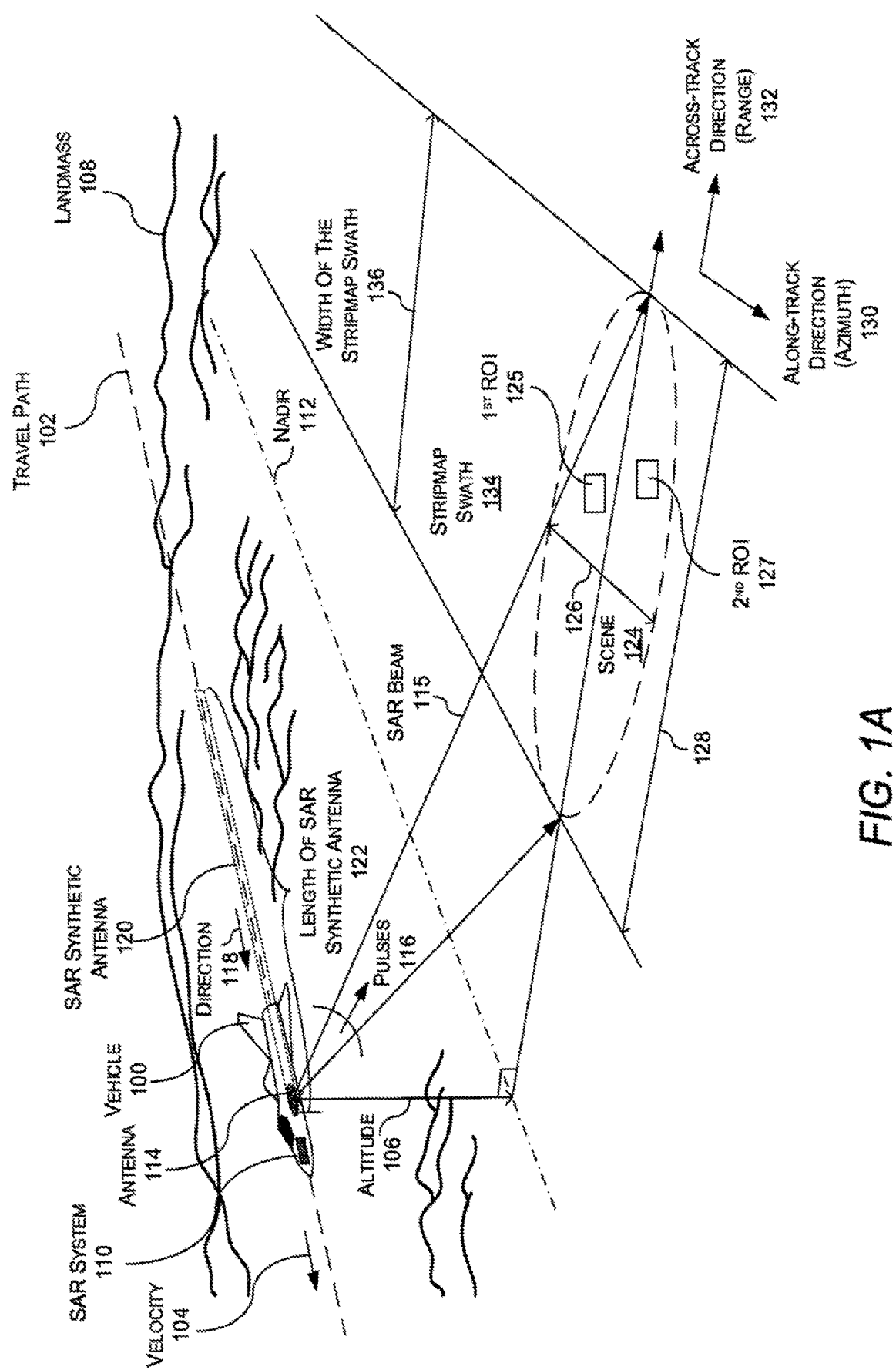
FIGS. 1A and 1B schematically illustrate an example implementation of a synthetic aperture radar (SAR) system in a vehicle traveling relative to a scene.

Turning to FIG. 1A, an example implementation of a SAR system in a vehicle 100 is schematically shown. Specifically, the vehicle is using the SAR system in a "stripmap" mode while flying along a straight flight path (i.e., travel path 102) with a constant velocity 104 and at a constant altitude 106 over a landmass 108 in accordance with the subject disclosure. The vehicle 100 (also known as a platform) can be, for example, a manned or unmanned aircraft such as an airplane, a drone, a spacecraft, a rotorcraft, or other type of unmanned or manned vehicle. The vehicle 100 flies along the travel path 102 at the constant altitude 106, such that a SAR system 110 (on the vehicle 100) is directly above a nadir 112. In this example, the nadir 112 is a locus of points on the surface of the Earth (e.g., the landmass 108) directly below an antenna 114 of the SAR system 110. It is appreciated by those of ordinary skill in the art that in radar systems the nadir 112 is the beginning of the range parameter of a SAR radar.

In an example of operation, the SAR system 110 radiates (e.g., transmits) SAR radar signal pulses 116 obliquely at an approximate normal (e.g., a right angle) direction to a direction 118 of the flight along the travel path 102. The SAR radar signal pulses 116 are electromagnetic waves that are sequentially transmitted from the antenna 114, which is a "real" physical antenna located on the vehicle 100. As an example, the SAR radar signal pulses 116 can be linear frequency modulated chip signals.

The antenna 114 is fixed and directed (e.g., aimed) outward from a side of the vehicle 100 at an obliquely and approximately normal direction to the side of the vehicle 100. The antenna 114 has a relatively small aperture size with a correspondingly small antenna length. As the vehicle 100 moves along the travel path 102, the SAR system 110 synthesizes a SAR synthetic antenna 120 that has a synthesized length 122 that is much longer than the length of the real antenna 114. It is appreciated by those of ordinary skill in the art that the antenna 114 can optionally be directed in a non-normal direction from the side of the vehicle 100. In this example, the angle at which the fixed antenna 114 is aimed away from the side of the vehicle 100 (and resultingly the travel path 102) will be geometrically compensated in the computations of the SAR system 110.

As the SAR radar signal pulses 116 hit the landmass, 108 they illuminate an observed scene 124 (also referred to as a "footprint," "parch," or "area") of the landmass 108 and scatter (e.g., reflect off the landmass 108). In this example, the scene 124 can include one or more ROIs within the scene 124 such as, for example, first ROI 125 and second ROI 127. The illuminated scene 124 corresponds to a width 126 and width 128 of the main beam of the real antenna 114 in an along-track direction 130 and across-track direction 132 as the main beam intercepts the landmass 108. In this example, the along-track direction 130 is parallel to the direction 118 of the travel path 102 of the vehicle 100 and it represents the azimuth dimension for the SAR system 110. Similarly, the across-track direction 132 is perpendicular (e.g., normal) to the travel path 102 of the vehicle 100 and it represents the range dimension of the SAR system 110. As the vehicle 100 travels along the travel path 102, the illuminated scene 124 defines a stripmap swath 134, having a swath width 136, which is a strip along the surface of the landmass 108 that has been illuminated by the illuminated scene 124 produced by the main beam of the antenna 114. In general, the length 122 of the SAR synthetic antenna 120 is directly proportional to the range 132 in that as the range 132 increases, the length 122 of the SAR synthetic antenna 120 increases.

Figure 1B:
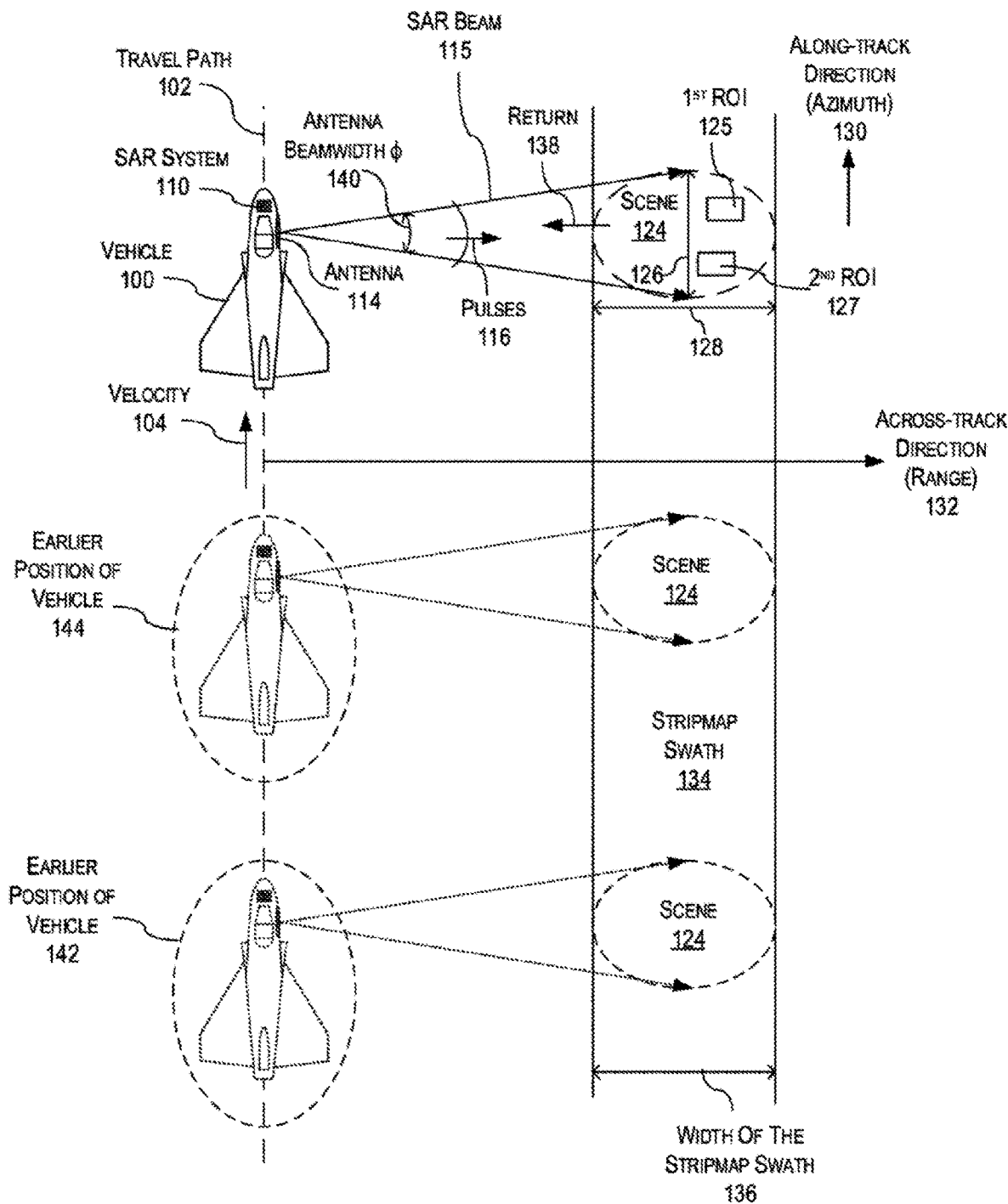

In FIG. 1B, a top view of the SAR system 110 in the vehicle 100 is shown in accordance with the subject disclosure. Again, the vehicle 100 is shown flying along the straight travel path 102 with a constant velocity 104. In operation, as the vehicle 100 flies along the travel path 102, the SAR system 110, through the antenna 114, radiates, within a SAR beam 115, the SAR radar signal pulses 116 at the ground (e.g., landmass 108) at an approximately normal direction from the travel path 102 (and the along-track direction 130), where the SAR radar signal pulses 116 illuminate the scene 124 of the landmass 108 and scatter. Scattering of the pulses produces backscatter waves, described herein as "return signals" 138 (i.e., backscattered return signals) that have reflected off the landmass 108 and reflected back towards the antenna 114. The antenna 114 receives the radar return signals 138 and passes them to the SAR system 110 that processes the radar return signals 138.

In this example, the processing can include recording and storing the radar return signals 138 in a storage (not shown) in a data grid structure. The SAR system 110 utilizes consecutive time intervals of radar transmission and reception to receive radar phase history data of the illuminated and observed scene (e.g., scene 124) at different positions along the travel path 102. Normally, the processing the combination of raw radar data (e.g., radar phase history data of illuminated scene) enables the construction of a SAR image (e.g., a high-resolution SAR image) of the captured scene (e.g., scene 124). However, the disclosed SAR system 110 obviates the need for the construction of SAR images, instead, the SAR system 110 estimates the geometric transformation parameters directly from the range profiles of the received phase history data and phase history template data.

In this example, the widths 126 and 128 of the main beam of the antenna 114 are related to the antenna beamwidth φ 140 of the main beam produced by the antenna 114. Additionally, in this example, the vehicle 100 is shown to have traveled along the travel path 102 scanning the stripmap swath 134 at different positions along the travel path 102, where, as an example, the SAR system 110 is shown to have scanned two earlier scenes 142 and 144 at two earlier positions 146 and 148 along the travel path 102.

It is appreciated by those of ordinary skill in the art that while the example vehicle 100 shown in FIGS. 1A and 1B is a manned aircraft, this is for illustrative purpose only and the vehicle 100 can also be an unmanned aircraft such as an unmanned aerial vehicle (UAV) or drone.

Furthermore, it is appreciated by those of ordinary skill in the art that, while vehicle 100 shown in FIGS. 1A and 1B is operating in a "stripmap" mode, this is a non-limiting example. As additional examples, SAR systems as described herein may be used in "circular" or "spotlight" scanning modes, in addition to or as an alternative to stripmap mode.

Figure 2:
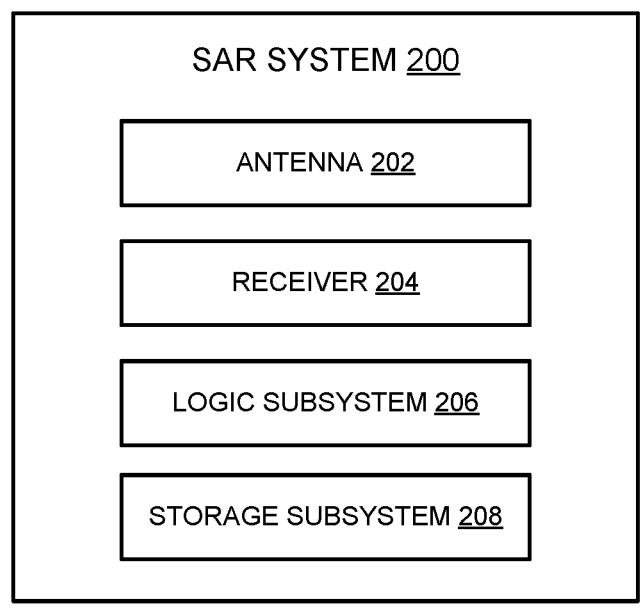
FIG. 2 schematically shows an example SAR system.

FIG. 2 schematically shows an example SAR system 200, which may perform any or all of the functions described above with respect to SAR system 110. In this example, the SAR system includes an antenna 202, a SAR receiver 204, a logic subsystem 206, and a storage subsystem 208. The SAR antenna and SAR receiver are implemented as any suitable hardware useable for illuminating a surrounding scene with a plurality of radar pulses, and detecting a plurality of return signals caused by reflection/backscattering of the radar pulses by objects in the scene. In some examples, the antenna is configured to both transmit electromagnetic waves (e.g., SAR radar signal pulses) and receive backscattered waves (e.g., return signals)—e.g., in some examples, the antenna and receiver are implemented together as a single structure. The antenna can be implemented as a phased-array antenna, horn type of antenna, parabolic antenna, or other type of antenna with high directivity, as non-limiting examples. Example implementations of logic subsystem 206 and storage subsystem 208 are described below with respect to FIG. 10—e.g., in some examples, SAR system 200 is implemented as computing system 1000 of FIG. 10.

In general, the SAR system 200 is utilized to capture and process phase history data from observation views, of the scene 124 in the swath 134, in accordance with various techniques described in the subject disclosure. The SAR system 200 is in some examples a SAR navigation guidance system that comprises a SAR radar device that transmits and receives electromagnetic radiation and provides representative data in the form of raw radar phase history data. As an example, the SAR system 200 is implemented to transmit and receive radar energy pulses in one or more frequency ranges from less than one gigahertz to greater than sixteen gigahertz based on a given application for the SAR system 200.

Figure 3:
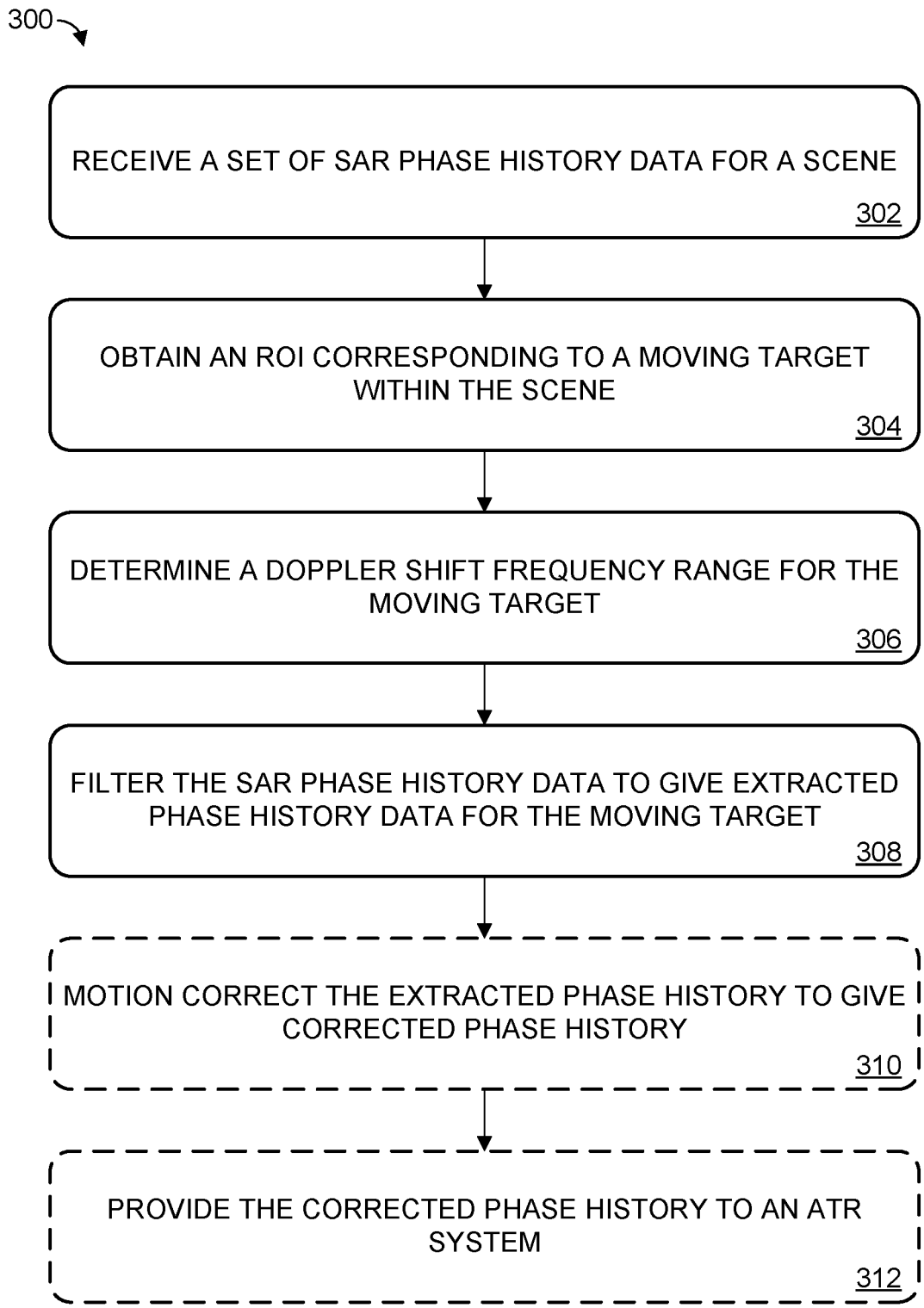
FIG. 3 illustrates an example method for SAR phase history extraction.

FIG. 3 illustrates an example method 300 for SAR phase history extraction. In particular, method 300 is useable to extract the SAR phase history for a moving target that contributes to the overall set of SAR phase history data collected for a scene—e.g., for the purposes of providing the phase history corresponding to the moving target to an ATR system configured to perform target recognition on the basis of phase history data. Steps of method 300 may be performed by any suitable computing system of one or more computing devices. Any device(s) implementing steps of method 300 have any suitable capabilities, hardware configuration, and form factor. Steps of method 300 may be repeated or looped at any suitable time and in response to any suitable trigger. In some examples, method 300 is implemented by computing system 1000 described below with respect to FIG. 10.

Figure 4:
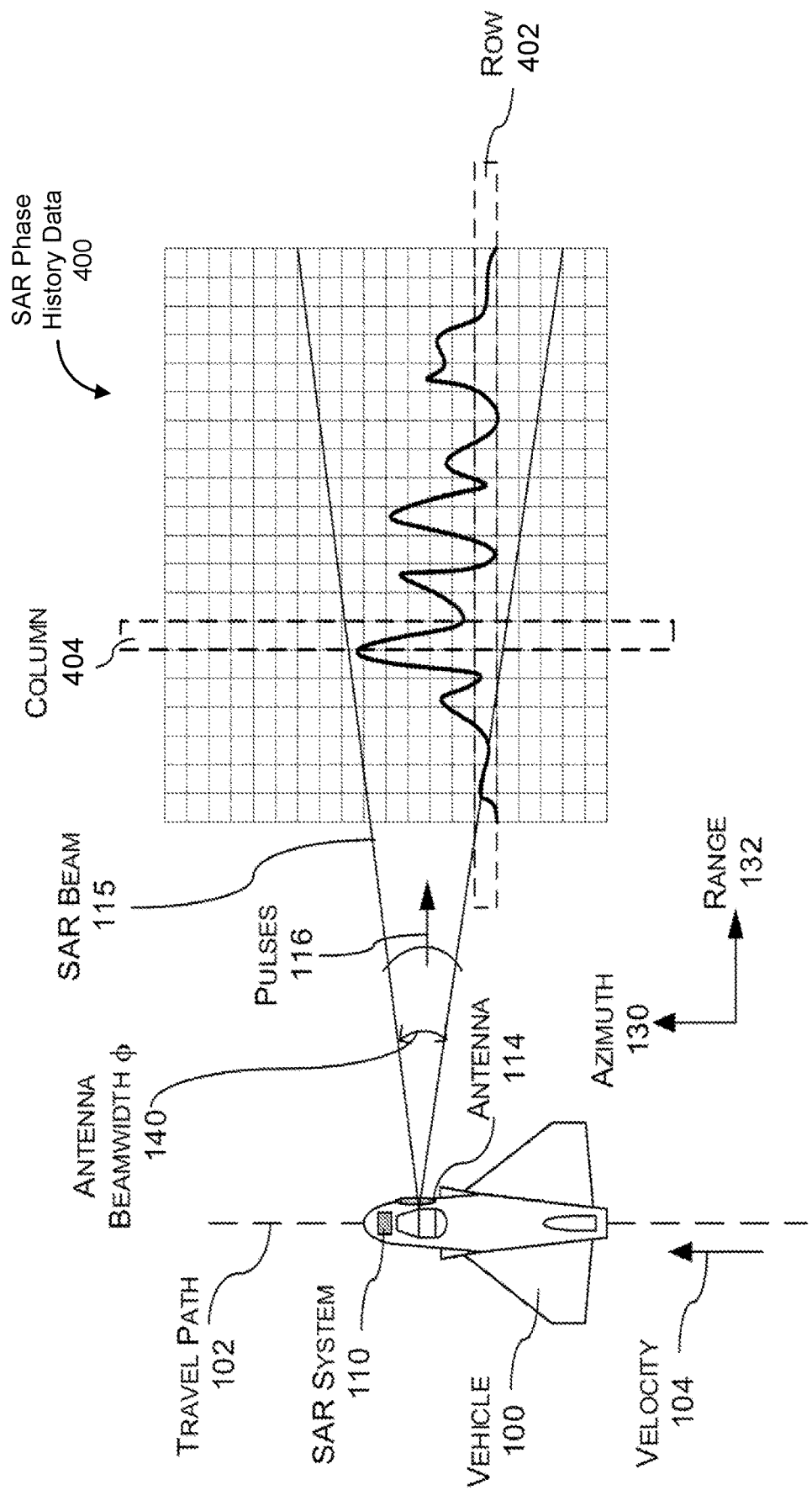
FIG. 4 schematically illustrates an example implementation of azimuth signal processing.

At 302, method 300 includes receiving, at a SAR system, a set of SAR phase history data derived from a plurality of return signals, the plurality of return signals produced by the SAR system illuminating a scene with a plurality of radar pulses. This is schematically illustrated with respect to FIG. 4. Specifically, FIG. 4 schematically illustrates collection, by SAR system 110 of vehicle 100, a set of SAR phase history data 400. In other words, in the example of FIG. 4, the SAR system is a component of an aerial vehicle that is moving relative to the scene.

In this example, the SAR phase history data 400 is shown as a grid data structure having rows along the azimuth direction (e.g., the along-track direction 130) and columns along the range direction (e.g., the across-track direction 132). In an example of operation, the discrete samples of the radar return signals 138 are recorded and stored in the set of SAR phase history data. Each row 402 of the data structure includes the discrete samples of a radar return signal (from the radar return signals 138) from a single transmitted SAR radar signal pulse from the SAR radar signal pulses 116. The next row up includes samples of the radar return signal from the next transmitted SAR radar signal pulse, and so on. As such, the signal samples stored along a given column 404 constitute an "induced azimuth signal," also referred to herein simply as an "azimuth signal."

In this example, the induced azimuth signal is produced by storing the SAR phase history data in a two-dimensional data storage structure (e.g., the set of SAR phase history data 400) having the plurality of rows and columns (including row 402 and column 404). Each column of the plurality of columns corresponds to a range value that is measured from a location of the SAR system 110 to the location of the first ROI 125 in a normal direction to a travel path 102 of the SAR system 110 and each column of the plurality of columns is arranged in a direction parallel to the direction of the travel path 102. Additionally, each row includes discrete signal samples of the range values from the SAR phase data and each column includes the induced azimuth signal at the corresponding range value.

Returning briefly to FIG. 3, at 304, method 300 includes obtaining an ROI corresponding to a moving target within the scene. The specific location of the ROI is obtained in any suitable way. In some examples, the ROI is obtained via global positioning system (GPS) coordinates, a ground spotter, and/or a targeting system. Alternatively, the location of the ROI can be derived from the SAR phase history data. As one non-limiting example, this includes creating a pseudo-image of the scene from the SAR phase history data, detecting salient features of energy in the pseudo-image, and detecting the ROI within the scene by generating a bounding ellipse around the detected salient features of energy.

Figure 5:
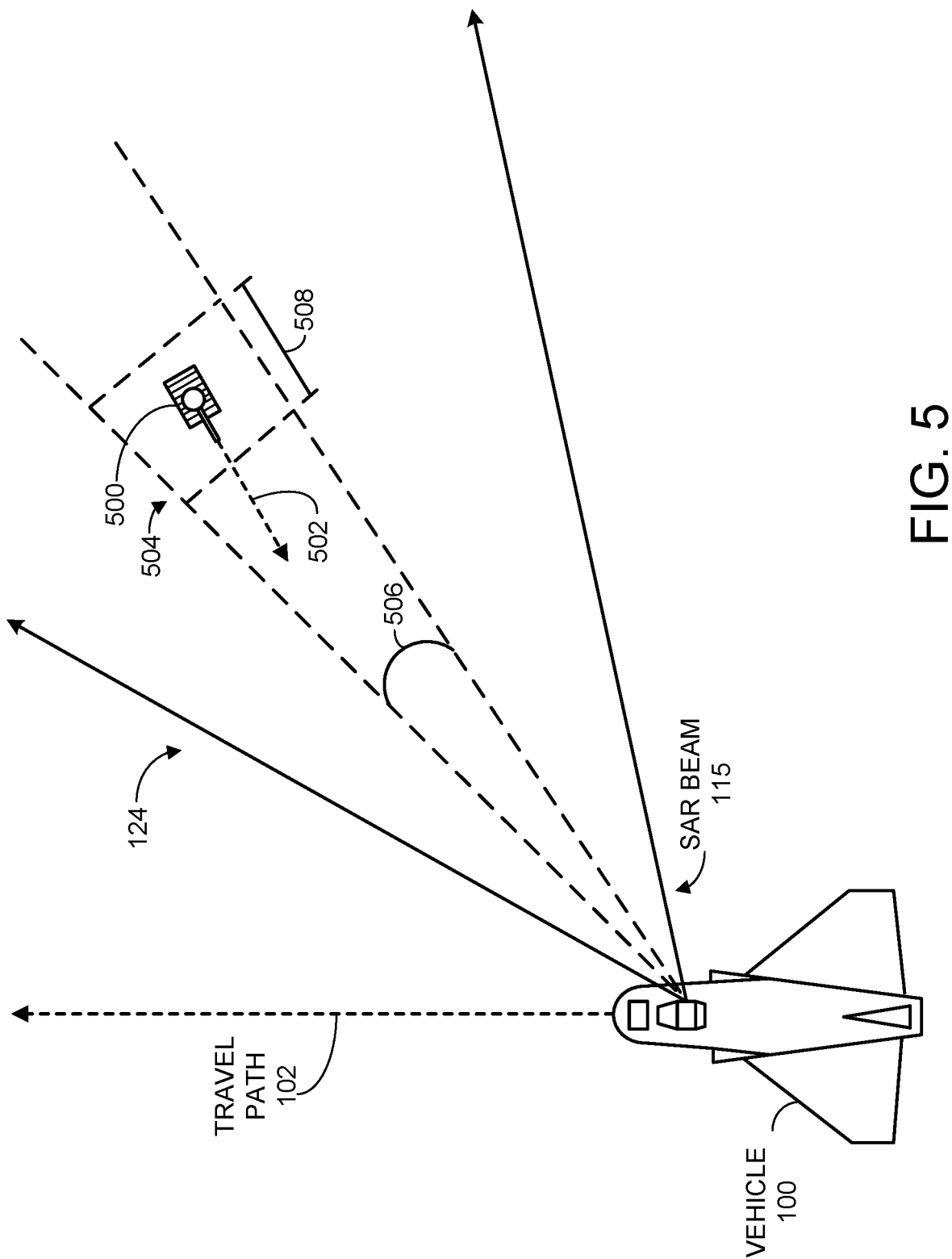
FIG. 5 schematically illustrates identification of a region of interest (ROI) corresponding to a moving target within a scene.

Obtaining an ROI for a moving target is schematically illustrated with respect to FIG. 5, again showing vehicle 100 travelling along travel path 102 relative to a scene 124. A SAR beam is emitted by the SAR system of vehicle 100 and used to illuminate the scene with a plurality of radar pulses, as described above. In FIG. 5, the scene includes a moving target 500, which in this example takes the form of a tank. The target is moving in a movement direction 502. It will be understood that this is non-limiting, and that a "moving target" takes any suitable form. As other non-limiting examples, the moving target takes the form of other ground-based vehicles (e.g., cars, trucks, motorcycles, karts, robots), aquatic vehicles, aerial vehicles, living things (e.g., animals), and/or natural phenomena (e.g., moving rocks, floating debris).

In FIG. 5, the moving target is enclosed by an ROI 504. The ROI is defined in this example by an azimuth angle spread 506, which includes a range of azimuth angles that encompass the ROI from the perspective of the SAR system, and a distance range 508, corresponding to a range of physical distances between the SAR system and the closest and furthest borders of the ROI. It will be understood that the size of the ROI shown in FIG. 5 is non-limiting. In general, the ROI is sufficiently large to fully encompass the moving target of interest. The ROI in some examples includes additional buffer space beyond the moving target.

Figure 6A:
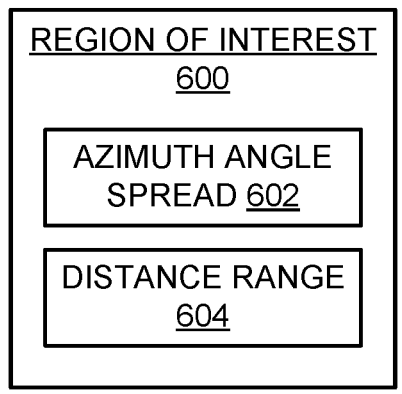
FIGS. 6A-D schematically illustrate filtering SAR phase history data to give extracted phase history for a moving target.

FIG. 6A schematically represents a region of interest 600. Specifically, ROI 600 is defined by an azimuth angle spread 602—e.g., azimuth angle spread 506 shown in FIG. 5. ROI 600 is additionally defined by a distance range 604—e.g., distance range 508 of FIG. 5. As will be described in more detail below, in some examples, the azimuth angle spread and distance range are each used to filter the set of SAR phase history data to give extracted phase history corresponding to the moving target—e.g., moving target 500 located within ROI 504.

Figure 6B:
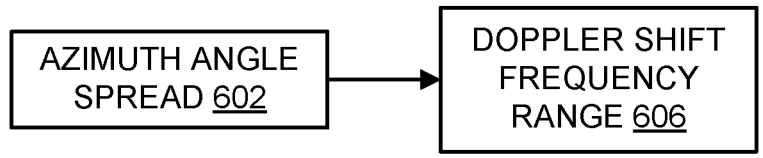

Returning to FIG. 3, at 306, method 300 includes determining a doppler shift frequency range for the moving target based at least in part on an azimuth angle spread corresponding to the ROI and a known approximate trajectory of the moving target. This is schematically illustrated with respect to FIG. 6B, in which the azimuth angle spread 602 is used to derive a doppler shift frequency range 606.

It will be understood that the doppler shift frequency range is derived in any suitable way. Furthermore, the known approximate trajectory of the moving target is determined or estimated in any suitable way. In some examples, the known approximate trajectory of the moving target is determined in the same manner as the ROI of the moving target—e.g., via GPS coordinates, a targeting system, a ground spotter, and/or via analysis of the SAR phase history data. In some examples, by observing changes in position of the ROI corresponding to the moving target over time, the trajectory of the moving target is extrapolated.

In one non-limiting approach, the doppler frequencies $f_D$ within the doppler shift frequency range are calculated according to the following expression, where $\lambda$ is the wavelength of the radar carrier frequency, $\Theta$ is an azimuth angle within the azimuth angle spread, $V_x$ and $V_y$ are the rate of change of the x position (e.g., relative to an axis perpendicular to the travel path of the SAR platform) and the y position (e.g., relative to an axis parallel to the travel path of the SAR platform) of the moving target over time as inferred from the known approximate trajectory, and $V_p$ is the velocity of the SAR platform:

$$f_D = -\frac{2}{\lambda}(V_x \cos\Theta + V_y \sin\Theta) + \frac{2V_p}{\lambda}\sin\Theta$$

Figure 6C:
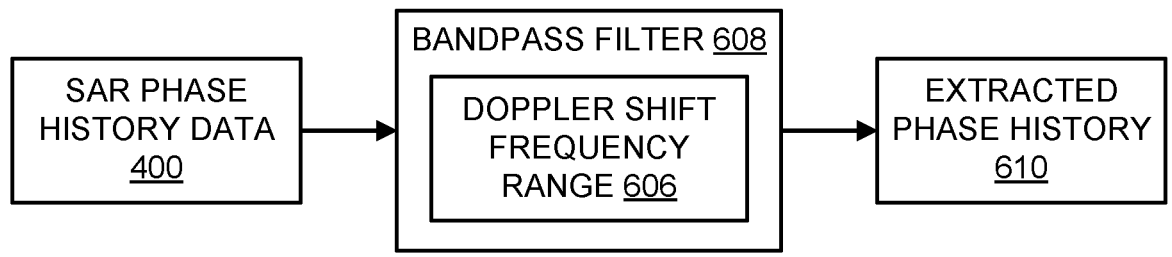

At 308, method 300 includes filtering the SAR phase history data to give extracted phase history corresponding to the moving target based at least in part on the doppler shift frequency range. This is schematically illustrated with respect to FIG. 6C. Specifically, in this example, filtering the SAR phase history data includes bandpass filtering the SAR phase history data to frequencies within the doppler shift frequency range. In FIG. 6C, a bandpass filter 608 is used to filter the set of SAR phase history data 400 to give extracted phase history 610, where the bandpass filter selects for the doppler shift frequency range 606. In other words, the set of SAR phase history data is filtered to substantially exclude the contributions of objects in the scene falling outside the azimuth angle spread that corresponds to the ROI.

Figure 6D:
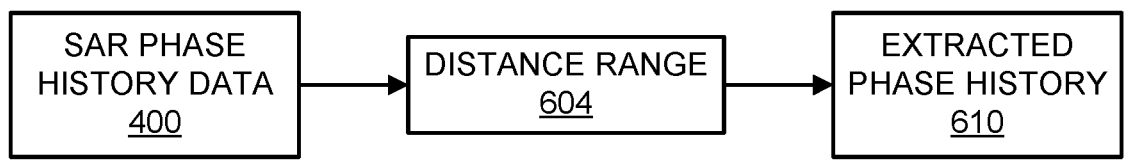

In some examples, filtering the SAR phase history further includes truncating the SAR phase history based on the distance range of the ROI. This is schematically illustrated with respect to FIG. 6D, in which the SAR phase history data 400 is truncated based on distance range 604 to give the extracted phase history 610 for the moving target. In other words, the SAR phase history is truncated to substantially exclude the contributions of objects in the scene falling outside the distance range of the ROI. To use the example of FIG. 4, the set of SAR phase history data may be filtered to exclude one or more of the columns 404—e.g., the SAR phase history data may be filtered to include only a single column, corresponding to the distance range.

It will be understood that bandpass filtering the SAR phase history data, and truncating the SAR phase history data based on the distance range, may be done in any order. In other words, in some examples, the SAR phase history data is bandpass filtered and then truncated, while in other examples, the SAR phase history data is truncated and then bandpass filtered. Furthermore, it will be understood that, in some examples, bandpass filtering and truncation need not each be performed, although this can potentially contribute to the extracted phase history of the moving target being influenced by other features within the scene to a greater extent.

Figure 7A:
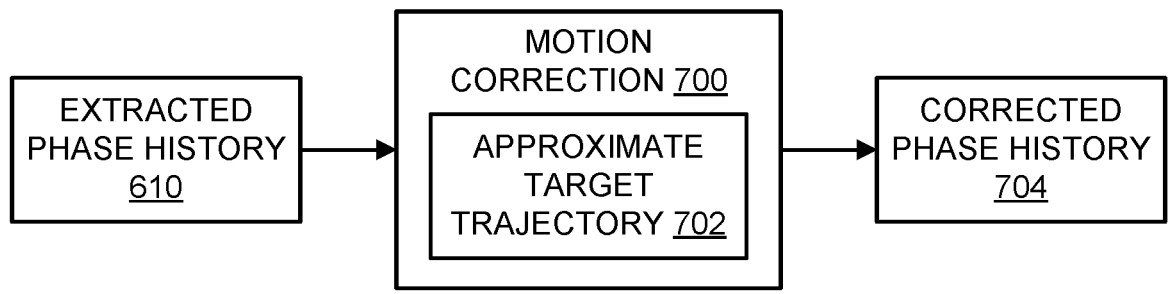

Returning briefly to FIG. 3, at 310, method 300 optionally includes motion correcting the extracted phase history to give a corrected phase history based at least in part on the known approximate trajectory of the moving target. This can beneficially reduce the impact of motion-induced distortions in the phase history data, which can improve the performance of downstream processing steps (e.g., target recognition via an ATR system). Motion correction is schematically illustrated with respect to FIG. 7A, in which a motion correction operation 700 is applied to the extracted phase history 610 of the moving target to give a corrected phase history 704, where the motion correction is based at least in part on the target's approximate trajectory 702.

Figure 7B:
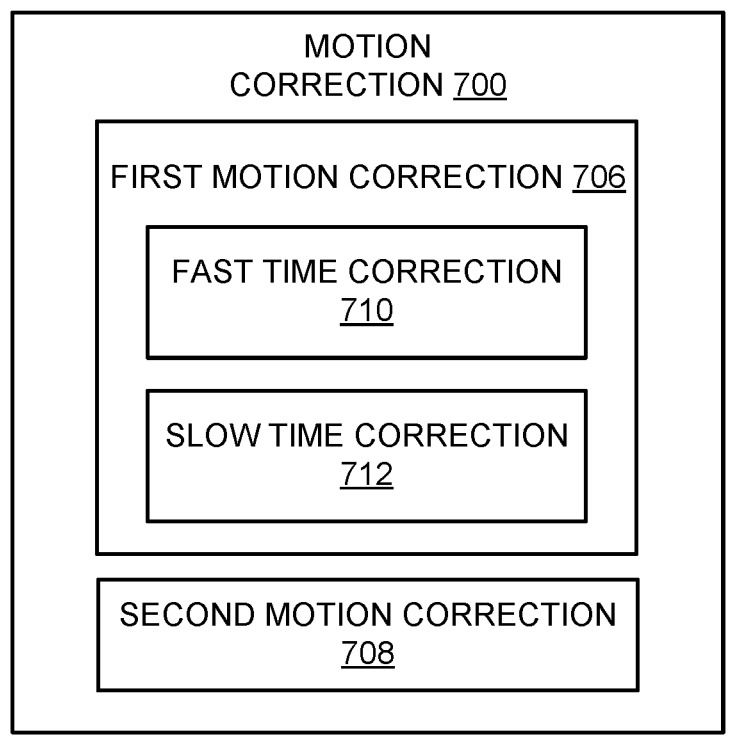

In some examples, motion correcting the extracted phase history includes applying a first motion correction to account for the known approximate trajectory of the moving target, and a second motion correction to account for unsteady perturbations of the moving target—e.g., unpredictable changes in the target's trajectory caused by terrain, influence of a human driver, air currents, or water currents, as examples. This is schematically illustrated with respect to FIG. 7B, in which the motion correction operation 700 includes a first motion correction 706 and a second motion correction 708. As will be described in more detail below, in some examples, the first motion correction 706 includes applying a fast time correction 710 and a slow time correction 712.

The fast time correction is schematically illustrated with respect to FIG. 7C. Specifically, the fast time correction is used to account for a perpendicular motion component 714 of the moving target relative to the travel path of the SAR platform—e.g., motion of the target relative to an axis that is perpendicular to the travel path of the SAR platform. Such motion influences the length of time required for a radar pulse to travel from the SAR antenna to the target, and then travel from the target back to the SAR antenna upon reflection. Movement of the target away from the SAR platform increases this travel time, while movement of the target toward the SAR platform reduces the travel time. This is given by the following expression, where r is the time shift, c is the speed of light, and dx is the target displacement perpendicular to the SAR platform path relative to its original location for the current pulse return under consideration:

$$\tau = 2dx/c$$

As used above, "original location" refers to the location of the target when SAR data collection begins. The time-shifted signal can be projected onto the SAR system's signal sampling times via simple interpolation.

As such, applying the fast time correction includes, in some examples, time-shifting one or more of the plurality of return signals based at least in part on the perpendicular motion component of the moving target. In FIG. 7C, two non-limiting and highly simplified return signals 716A and 716B are shown. In this example, return signal 716B is time-shifted as indicated by arrow 718 to account for the perpendicular motion component 714 of the trajectory of the moving target. Such time-shifting recreates the static case—e.g., where the target is stationary relative to the background scene.

The slow time correction is schematically illustrated with respect to FIG. 7D. Specifically, the slow time correction is used to account for a parallel motion component 720 of the moving target relative to the travel path of the SAR platform—e.g., motion of the target relative to an axis that is parallel to the travel path of the SAR platform. Such motion influences the interval between return signals reflecting off the target being detected at the SAR system. In other words, the amount of time between two consecutive return signals being detected is either dilated or contracted depending on the sign of the parallel motion component. To a first order approximation, this is given by the following expression, where η is a time interval between return signals, $y_p$ is the y-coordinate of the SAR platform, and dy is the target displacement parallel to the SAR platform path relative to its original location for the pulse return under consideration:

$$\eta_{moving} = \left(\frac{y_p}{y_p - dy}\right) * \eta_{static}$$

As such, applying the slow time correction includes, in some examples, dilating or contracting a time interval between two or more of the plurality of return signals based at least in part on a parallel motion component of the moving target. In FIG. 7D, a time interval 722 between return signal 716A and 716B is either dilated or contracted by an amount based on the parallel motion component 720 of the moving target.

As discussed above, in some cases the motion correction operation includes a second motion correction to account for unsteady trajectory perturbations of the moving target. Because the motion correction is applied after the phase history for the moving target is extracted from the set of SAR phase history data for the scene, it is expected that differences between consecutive return signals will be largely due to range variation caused by lateral undulation of the target. As such, using match filtering, it is possible to maximize the correlation between successive pulse returns to calculate a shift in fast time that mitigates or eliminates the lateral unsteady motion distortion. In other words, in some examples, the second motion correction includes time shifting a return signal of the plurality of return signals by an amount that increases a correlation with a preceding return signal. In some examples, this can be done using the following non-limiting approach:

1. Convolve pulse return (k+1) with the complex conjugate of pulse return k.
2. Find a time shift of pulse return (k+1) that maximizes the convolution in step 1.
3. Apply that time shift to pulse return (k+1).
4. Repeat for each successive pulse return (k+2), (k+3) . . . (k+x).

Figure 7E:
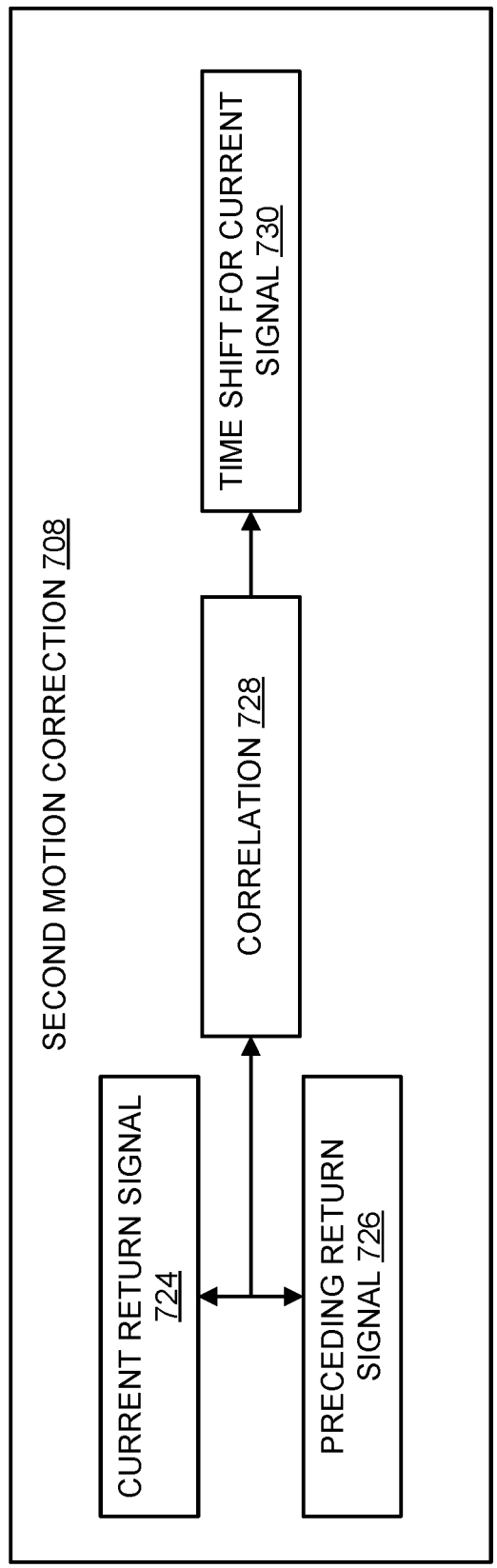

This is schematically illustrated with respect to FIG. 7E, in which the correlation 728 is determined between a current return signal 724 and a preceding return signal 726, as part of the second motion correction 708. Using match filtering, a time shift 730 is identified that, when applied to the current return signal, maximizes the correlation 728. It will be understood that, when wide beam stripmap mode or spotlight mode is used, the shift between successive pulse returns may also be adjusted according to normal range migration as typically occurs in SAR scenarios.

Figure 8:
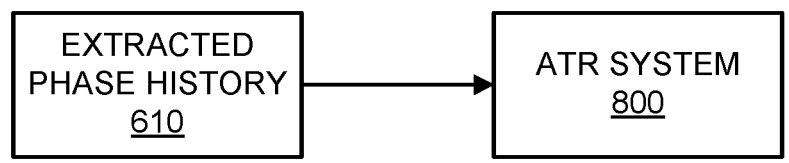
FIG. 8 schematically illustrates providing extracted phase history to a moving target to an automatic target recognition (ATR) system.

Returning briefly to FIG. 3, at 312, method 300 optionally includes providing the extracted phase history to an ATR system configured to perform target recognition based on input phase history data. This is schematically illustrated with respect to FIG. 8, in which the extracted phase history 610 for the moving target is provided to an ATR system 800. As discussed above, this can beneficially enable target recognition of the moving target, while substantially conserving computational resources as compared to scenarios where the phase history is first converted into an image, and then feature recognition is used to identify ROIs within the image. Furthermore, in some examples, the extracted phase history is first motion corrected before it is provided to the ATR system as described above. This beneficially reduces the impact of motion-induced distortions in the phase history, and can improve performance of the ATR system.

Figure 9:
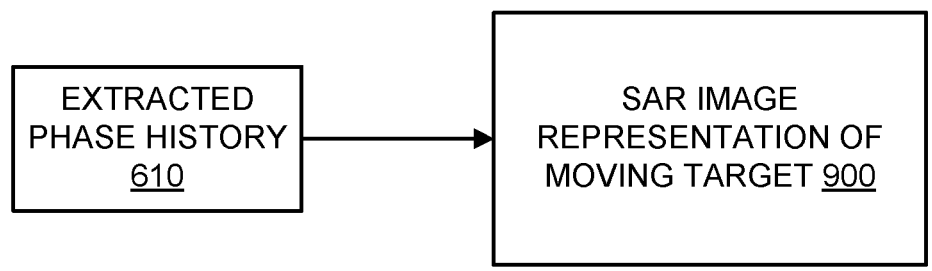
FIG. 9 schematically illustrates conversion of extracted phase history into a SAR image representation of a moving target.

However, the extracted phase history as described herein beneficially can still be used to generate a focused SAR image of the moving target. In other words, in some examples, the SAR system converts the extracted phase history (e.g., after motion correction as described above) into a SAR image representation of the moving target, using any suitable existing technique for generating images from SAR phase history data. This is schematically illustrated with respect to FIG. 9, in which the extracted phase history 610 is used to generate a SAR image representation 900 of the moving target. In some cases, this can still result in conservation of computational resources, as it obviates the need to perform feature recognition to identify ROIs in a SAR image of the scene—rather, the resultant image is already focused on the moving target, as it was derived from the extracted phase history. Furthermore, such an image can beneficially be provided to conventional ATR systems that are configured to perform target recognition on the basis of image data.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
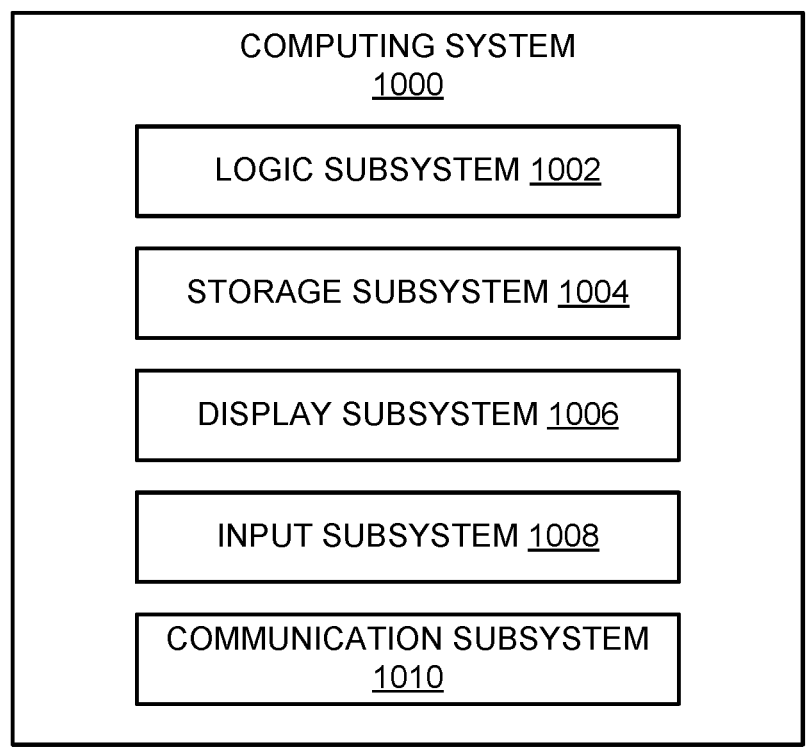
FIG. 10 schematically shows an example computing system.

FIG. 10 schematically shows a simplified representation of a computing system 1000 configured to provide any to all of the compute functionality described herein. Computing system 1000 may take the form of one or more network-accessible devices, server computers, mobile computing devices, Internet of Things (IoT) devices, embedded computing devices, vehicle computing systems, SAR systems, vehicle guidance systems, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for synthetic aperture radar (SAR) phase history extraction comprises: receiving, at a SAR system, a set of SAR phase history data derived from a plurality of return signals, the plurality of return signals produced by the SAR system illuminating a scene with a plurality of radar pulses; obtaining a region of interest (ROI) corresponding to a moving target within the scene; determining a doppler shift frequency range for the moving target based at least in part on an azimuth angle spread corresponding to the ROI and a known approximate trajectory of the moving target; and filtering the SAR phase history data to give extracted phase history corresponding to the moving target based at least in part on the doppler shift frequency range. In this example or any other example, the method further comprises motion correcting the extracted phase history to give a corrected phase history based at least in part on the known approximate trajectory of the moving target. In this example or any other example, motion correcting the extracted phase history includes applying a first motion correction to account for the known approximate trajectory of the moving target, and a second motion correction to account for unsteady trajectory perturbations of the moving target. In this example or any other example, the first motion correction includes a fast time correction, in which one or more of the plurality of return signals are time-shifted based at least in part on a perpendicular motion component of the moving target. In this example or any other example, the first motion correction includes a slow time correction, in which a time interval between two or more of the plurality of return signals is dilated or contracted based at least in part on a parallel motion component of the moving target. In this example or any other example, the second motion correction includes time shifting a return signal of the plurality of return signals by an amount that increases a correlation with a preceding return signal. In this example or any other example, filtering the SAR phase history data includes bandpass filtering the SAR phase history to frequencies within the doppler shift frequency range. In this example or any other example, obtaining the ROI corresponding to the moving target includes determining a distance range of the ROI, and wherein filtering the SAR phase history includes truncating the SAR phase history based on the distance range of the ROI. In this example or any other example, the method further comprises providing the extracted phase history to an automatic target recognition (ATR) system configured to perform target recognition based on input phase history data. In this example or any other example, the method further comprises converting the extracted phase history into a SAR image representation of the moving target. In this example or any other example, the SAR system is a component of an aerial vehicle that is moving relative to the scene.

In an example, a synthetic aperture radar (SAR) system comprises: a logic subsystem; and a storage subsystem holding instructions executable by the logic subsystem to: receive a set of SAR phase history data derived from a plurality of return signals, the plurality of return signals produced by the SAR system illuminating a scene with a plurality of radar pulses; obtain a region of interest (ROI) corresponding to a moving target within the scene; determine a doppler shift frequency range for the moving target based at least in part on an azimuth angle spread corresponding to the ROI and a known approximate trajectory of the moving target; and filter the SAR phase history data to give extracted phase history corresponding to the moving target based at least in part on the doppler shift frequency range. In this example or any other example, the instructions are further executable to motion correct the extracted phase history to give a corrected phase history based at least in part on the known approximate trajectory of the moving target. In this example or any other example, motion correcting the extracted phase history includes applying a first motion correction to account for the known approximate trajectory of the moving target, and a second motion correction to account for unsteady trajectory perturbations of the moving target. In this example or any other example, the first motion correction includes a fast time correction, in which one or more of the plurality of return signals are time-shifted based at least in part on a perpendicular motion component of the moving target. In this example or any other example, the first motion correction includes a slow time correction, in which a time interval between two or more of the plurality of return signals is dilated or contracted based at least in part on a parallel motion component of the moving target. In this example or any other example, the second motion correction includes time shifting a return signal of the plurality of return signals by an amount that increases a correlation with a preceding return signal. In this example or any other example, the instructions are further executable to provide the extracted phase history to an automatic target recognition (ATR) system configured to perform target recognition based on input phase history data. In this example or any other example, the instructions are further executable to convert the extracted phase history into a SAR image representation of the moving target.

In an example, a method for synthetic aperture radar (SAR) phase history extraction comprises: receiving, at a SAR system, a set of SAR phase history data derived from a plurality of return signals, the plurality of return signals produced by the SAR system illuminating a scene with a plurality of radar pulses; obtaining a region of interest (ROI) corresponding to a moving target within the scene; determining a doppler shift frequency range for the moving target based at least in part on an azimuth angle spread corresponding to the ROI and a known approximate trajectory of the moving target; filtering the SAR phase history data to give extracted phase history corresponding to the moving target based at least in part on the doppler shift frequency range; motion correcting the extracted phase history to give a corrected phase history based at least in part on the known approximate trajectory of the moving target; and providing the corrected phase history to an automatic target recognition (ATR) system configured to perform target recognition based on input phase history data.

The invention claimed is:

1. A method for synthetic aperture radar (SAR) phase history extraction, the method comprising:
   receiving, at a SAR system, a set of SAR phase history data derived from a plurality of return signals, the plurality of return signals produced by the SAR system illuminating a scene with a plurality of radar pulses;
   obtaining a region of interest (ROI) corresponding to a moving target within the scene, wherein obtaining the ROI includes determining a distance range of the ROI;
   determining a doppler shift frequency range for the moving target based at least in part on an azimuth angle spread corresponding to the ROI and a known approximate trajectory of the moving target; and
   filtering the SAR phase history data to give extracted phase history corresponding to the moving target based at least in part on the doppler shift frequency range, and wherein filtering the SAR phase history includes truncating the SAR phase history based on the distance range of the ROI.

2. The method of claim 1, further comprising motion correcting the extracted phase history to give a corrected phase history based at least in part on the known approximate trajectory of the moving target.

3. The method of claim 2, wherein motion correcting the extracted phase history includes applying a first motion correction to account for the known approximate trajectory of the moving target, and a second motion correction to account for unsteady trajectory perturbations of the moving target.

4. The method of claim 3, wherein the first motion correction includes a fast time correction, in which one or more of the plurality of return signals are time-shifted based at least in part on a perpendicular motion component of the moving target.

5. The method of claim 3, wherein the first motion correction includes a slow time correction, in which a time interval between two or more of the plurality of return signals is dilated or contracted based at least in part on a parallel motion component of the moving target.

6. The method of claim 3, wherein the second motion correction includes time shifting a return signal of the plurality of return signals by an amount that increases a correlation with a preceding return signal.

7. The method of claim 1, wherein filtering the SAR phase history data includes bandpass filtering the SAR phase history to frequencies within the doppler shift frequency range.

8. The method of claim 1, further comprising providing the extracted phase history to an automatic target recognition (ATR) system configured to perform target recognition based on input phase history data.

9. The method of claim 1, further comprising converting the extracted phase history into a SAR image representation of the moving target.

10. The method of claim 1, wherein the SAR system is a component of an aerial vehicle that is moving relative to the scene.

11. A synthetic aperture radar (SAR) system, comprising:
    a logic subsystem; and
    a storage subsystem holding instructions executable by the logic subsystem to:
       receive a set of SAR phase history data derived from a plurality of return signals, the plurality of return signals produced by the SAR system illuminating a scene with a plurality of radar pulses;
       obtain a region of interest (ROI) corresponding to a moving target within the scene;
       determine a doppler shift frequency range for the moving target based at least in part on an azimuth angle spread corresponding to the ROI and a known approximate trajectory of the moving target;
       filter the SAR phase history data to give extracted phase history corresponding to the moving target based at least in part on the doppler shift frequency range; and
       motion correct the extracted phase history to give a corrected phase history by applying a first motion correction to account for the known approximate trajectory of the moving target, and a second motion correction to account for unsteady trajectory perturbations of the moving target.

12. The SAR system of claim 11, wherein the first motion correction includes a fast time correction, in which one or more of the plurality of return signals are time-shifted based at least in part on a perpendicular motion component of the moving target.

13. The SAR system of claim 11, wherein the first motion correction includes a slow time correction, in which a time interval between two or more of the plurality of return signals is dilated or contracted based at least in part on a parallel motion component of the moving target.

14. The SAR system of claim 11, wherein the second motion correction includes time shifting a return signal of the plurality of return signals by an amount that increases a correlation with a preceding return signal.

15. The SAR system of claim 11, wherein the instructions are further executable to provide the extracted phase history to an automatic target recognition (ATR) system configured to perform target recognition based on input phase history data.

16. The SAR system of claim 11, wherein the instructions are further executable to convert the extracted phase history into a SAR image representation of the moving target.

17. A method for synthetic aperture radar (SAR) phase history extraction, the method comprising:
   receiving, at a SAR system, a set of SAR phase history data derived from a plurality of return signals, the plurality of return signals produced by the SAR system illuminating a scene with a plurality of radar pulses;
   obtaining a region of interest (ROI) corresponding to a moving target within the scene;
   determining a doppler shift frequency range for the moving target based at least in part on an azimuth angle spread corresponding to the ROI and a known approximate trajectory of the moving target;
   filtering the SAR phase history data to give extracted phase history corresponding to the moving target based at least in part on the doppler shift frequency range;
   motion correcting the extracted phase history to give a corrected phase history based at least in part on the known approximate trajectory of the moving target, wherein motion correcting the extracted phase history includes applying a fast time correction in which one or more of the plurality of return signals are time-shifted based at least in part on a perpendicular motion component of the moving target, and applying a slow time correction in which a time interval between two or more of the plurality of return signals is dilated or contracted based at least in part on a parallel motion component of the moving target; and
   providing the corrected phase history to an automatic target recognition (ATR) system configured to perform target recognition based on input phase history data.

18. The SAR system of claim 11, wherein obtaining the ROI corresponding to the moving target includes determining a distance range of the ROI, and wherein filtering the SAR phase history includes truncating the SAR phase history based on the distance range of the ROI.

19. The SAR system of claim 11, wherein filtering the SAR phase history data includes bandpass filtering the SAR phase history to frequencies within the doppler shift frequency range.

20. The SAR system of claim 11, wherein the instructions are further executable to convert the extracted phase history into a SAR image representation of the moving target.

* * * * *